(12) United States Patent
Skierszkan et al.

(10) Patent No.: US 7,242,734 B2
(45) Date of Patent: Jul. 10, 2007

(54) FRAME BOUNDARY DISCRIMINATOR

(75) Inventors: Simon J. Skierszkan, Stittsville (CA); Wenbao Wang, Ottawa (CA)

(73) Assignee: Zarlink Semiconductor Inc., Kanata, ON (CA)

( * ) Notice: Subject to any disclaimer, the term of this patent is extended or adjusted under 35 U.S.C. 154(b) by 811 days.

(21) Appl. No.: 10/463,678

(22) Filed: Jun. 18, 2003

(65) Prior Publication Data

US 2004/0008732 A1 Jan. 15, 2004

(30) Foreign Application Priority Data

Jun. 18, 2002 (GB) .................................. 0213956.6

(51) Int. Cl.
*H04L 7/02* (2006.01)
(52) U.S. Cl. ...................... 375/359; 375/362; 375/371; 370/509; 370/516; 370/520; 713/502; 713/503
(58) Field of Classification Search ................ 375/354, 375/359, 362, 371, 373, 374, 376; 370/503, 370/509, 516, 520; 713/500, 502, 503
See application file for complete search history.

(56) References Cited

U.S. PATENT DOCUMENTS

| | | | |
|---|---|---|---|
| 3,887,769 A | 6/1975 | Cichetti, Jr. et al. | |
| 4,718,074 A | 1/1988 | Mannas et al. | |
| 4,737,722 A | 4/1988 | Ramesh et al. | |
| 5,428,649 A | 6/1995 | Cecchi | |
| 5,838,744 A | 11/1998 | Zheng | .......................... 375/355 |
| 6,778,623 B1 * | 8/2004 | Dietrich et al. | .............. 375/376 |
| 6,836,854 B2 * | 12/2004 | Ranganath et al. | ......... 713/503 |
| 2002/0025014 A1 * | 2/2002 | Jung | |

FOREIGN PATENT DOCUMENTS

EP 0 991 278 A2 5/2000

* cited by examiner

*Primary Examiner*—Dac V. Ha
(74) *Attorney, Agent, or Firm*—Marks & Clerk; Richard J. Mitchell

(57) ABSTRACT

A frame boundary discriminator has a first input for receiving a high speed master clock signal having a multitude of master clock pulses within a frame, and a second input for receiving synchronized input frame pulses subject to jitter. An output frame pulse generator controlled by the high speed master clock signal generates output frame pulses. A control circuit for compares the timing of the synchronized input frame pulses with said master clock pulses and adjusts the timing of said output frame pulses to average out jitter in the input frame pulses.

25 Claims, 5 Drawing Sheets

FRAME BOUNDARY DISCRIMINATOR

BACKGROUND OF THE INVENTION

1. Field of the Invention

This invention relates to telephony digital signal transmission, and more particularly to a method of boundary discrimination of a frame signal which defines the starting point of data to be transmitted or received.

2. Description of Related Art

Digital telephone circuits carry signals within predetermined time periods known as frames delineated by an 8 KHz timing signal or clock known as a frame pulse, which establishes a frame boundary. Each frame therefore defines a 125 microsecond period in which a digitized voice signal may be processed.

Different telephone circuits often have to be synchronized with each other for correct interoperation. In such synchronous systems, higher speed timing signals, which are synchronous to the 8 kHz timing signal, are also employed. These high speed timing signals are used to clock state machines that process signals. A state machine in effect maps an ordered sequence of input events into a corresponding sequence of output events. The capacity of related state machines to process signals in such a system is limited by the number of clock cycles available in a 125 microsecond frame.

This constraint may be reduced by increasing the frequency of the clock available to each individual circuit in the system, but the usage of higher speed clocks has the drawback of increasing the sensitivity of system to clock skew between components as well as increasing the level of electromagnetic radiation emanating from the clock tracking on the circuit board.

SUMMARY OF THE INVENTION

According to the present invention there is provided a frame boundary discriminator comprising a first input for receiving a high speed master clock signal having a multitude of master clock pulses within a frame; a second input for receiving synchronized input frame pulses subject to jitter; an output frame pulse generator controlled by said high speed master clock signal to generate output frame pulses; and a control circuit for comparing the timing of said synchronized input frame pulses with said master clock pulses and adjusting the timing of said output frame pulses to smooth out jitter in said input frame pulses.

This invention preferably makes use of a coarse timing signal (a low speed clock) as a distributed clock for the alignment of individual circuits that make up the system, detecting the variations between this low speed clock and a high speed system clock on per frame basis, and generating a precise frame boundary according to the long term accumulated average. Within an individual integrated circuit, the capacity for performing state machine operations can be increased by multiplying the low speed clock to a higher rate using an embedded phase lock loop. The higher speed clock will be subject to phase shifts with respect to the lower speed clock used to generate it because the embedded phase lock loops generally have loop filters in their feedback path. These filters tend to reduce the jitter between the reference clock and the generated clock. On a cycle-by-cycle basis, the phase relationship between the lower speed reference clock and the generated higher speed clock will vary in the presence of jitter on the lower speed clock.

In a device where the lower speed clock sets the frame boundary in conjunction with the 8 kHz timing, the alignment of this frame boundary can be in a state of flux with respect to the high speed clock with the presence of a jittered input clock and input frame pulse. State machines driven by the high speed clock may require a stable delineation of the frame boundary that is clocked by the high speed clock. A desirable delineation of this frame boundary would be that which coincides with the long term average frame boundary set by the coarse timing signals (the low speed clock in conjunction with the 8 kHz frame pulse). This delineation is desired because signals communicated between separate components in a system will be timed from the same presumed frame boundary, an important consideration in synchronous systems.

The present invention thus provide a means of establishing a periodic reference signal divided down from a higher speed periodic signal with the reference signal aligned in phase to an external reference signal of the same frequency. The phase alignment process is highly tolerant of jitter on the external reference signal, effectively eliminating all jitter within a narrow phase error band in creating the internal reference. It uses an averaging technique to create this internal reference signal with minimal circuitry.

The invention also provides a method of discriminating frame boundaries in a digital telephony, comprising the steps of generating a high speed master clock signal having a multitude of master clock pulses within a frame; receiving synchronized input frame pulses subject to jitter; comparing the timing of said synchronized input frame pulses with said master clock pulses; generating output frame pulses from said master clock pulses; and adjusting the timing of said output frame pulses to smooth out jitter in said input frame pulses.

BRIEF DESCRIPTION OF THE DRAWINGS

The invention will now be described in more detail, by way of example only, in which.

DETAILED DESCRIPTION OF THE PREFERRED EMBODIMENT

The described circuit in accordance with the invention generates an internal frame pulse which is stable even with a jittered input reference clock and input frame pulse. A higher speed master clock and a synchronized input frame pulse are required by this circuit. These are used as primary input signals.

Figure 6:
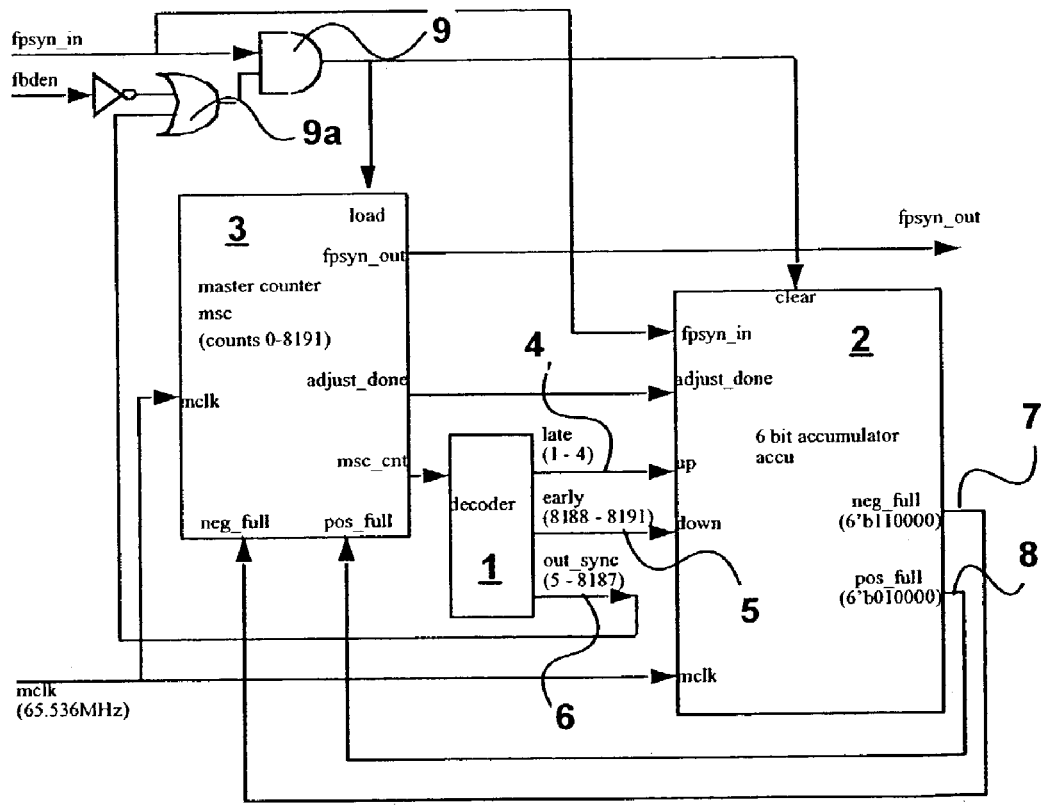
FIG. 6 is a block diagram of the circuit.

Referring first to FIG. 6, the boundary discriminator circuit comprises three major blocks, namely a decoder 1, an accumulator 2 (accu), and a master counter 3 (msc). The counter 3 is a modulo 8191 counter that can have a count value anywhere between 0 and 8191.

Decoder 1 decodes the count value of counter 3 and generates a late signal 4 when an input frame pulse arrives and the count value is 1-4, an early signal 5 when the count value is 8188-8191, and an out_of_sync signal 6, when the count value is from 5-8187. Signals 4 and 5 are input to the accumulator 2, which generates enables signals neg_full 7 and pos_full 8 in a manner to be described. Signal 6 is passed through OR gate 9a and AND gate 9 to a load input of the counter 3 and clear input of the accumulator 2.

When the signal 6 is asserted and an input frame pulse arrives at the input of gate 9, and gate 9 is enabled, the counter 3 is loaded with a value 1 as will be described in more detail.

Figure 1:
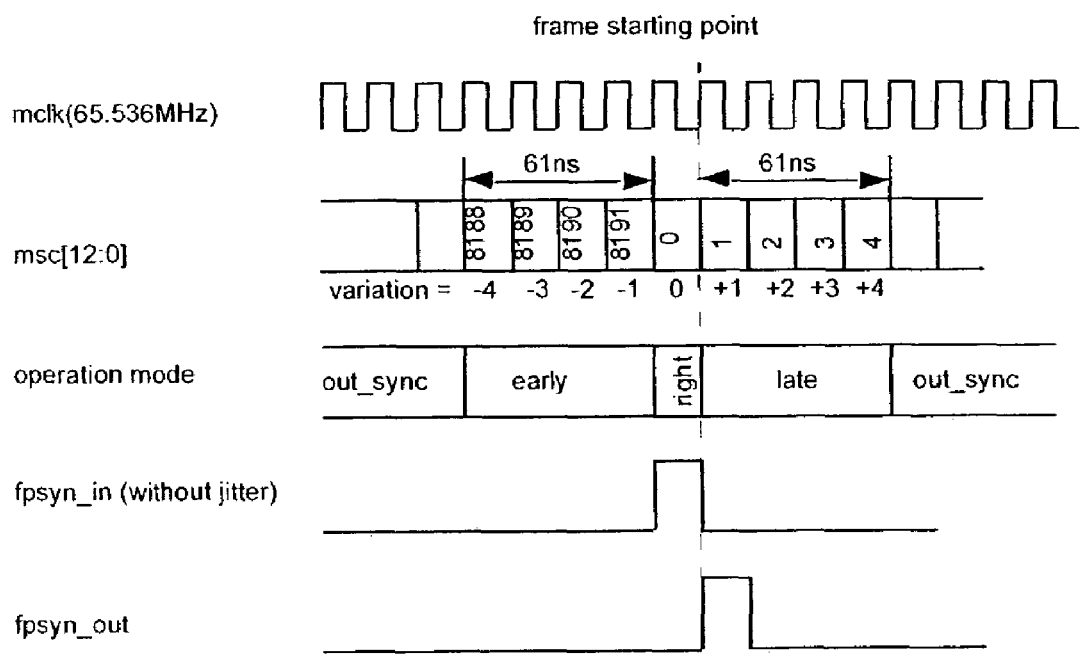
FIG. 1 is a timing diagram of the frame boundary discriminator circuit according to one embodiment of the invention.

The operation of the circuit will be more fully explained with reference to the timing charts in FIGS. 1 to 5. As shown in FIG. 1, the internal high speed master clock, namely mclk, is a 65.536 MHz signal. It can be generated from a reference clock in a manner known per se by using a multiplying phase-locked loop (PLL). The reference clock can be 4.096 MHz, 8.192 MHz or 16.384 MHz.

The synchronized frame pulse, namely fpsyn_in, is an 8 kHz pulse which is one master clock cycle wide. It is created from a low speed reference clock with its corresponding frame signal. The low speed reference clock is 4.096 MHz, 8.192 MHz or 16.384 MHz, and the corresponding frame signal is an 8 kHz pulse one reference clock cycle wide. Because the low speed reference clock can have jitter, the fpsyn_in is also a jittered signal.

The output of the boundary discriminator circuit is a modified frame pulse, namely fpsyn_out. When the fpsyn_in has no jitter, the modified frame pulse is, in this example, always one master clock cycle delayed from fpsyn_in as shown in FIG. 1. When the fpsyn_in has a specific jitter, which is within a range of −61 ns to +61 ns with respect to the frame starting point, and which is defined by the fpsyn_in going from high to low, the frame boundary discriminator circuit generates the fpsyn_out signal which has a fixed delay or advance with respect to the jittered input frame pulse fpsyn_in.

Figure 2:
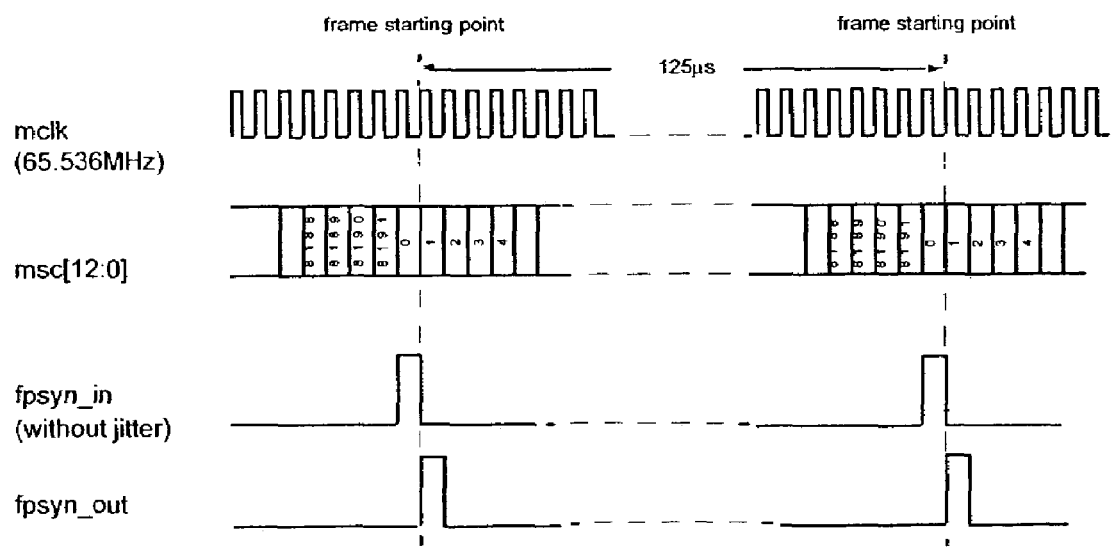
FIG. 2 a timing diagram of a master counter.

The master counter, namely msc [12:0], is 13-bit wide and is clocked by the signal mclk. At the frame starting point, the master counter msc is pre-loaded to "1" and then counts to "8191". After the count 8191, the msc saturates to "0", which corresponds to the end of the frame as shown in FIG. 2.

In an ideal case, when the fpsyn_in has no jitter, the fpsyn_in signal goes high when the master counter 3 counts to "0". The modified frame pulse, fpsyn_out, is then generated when the counter 3 counts to "1". In the presence of jitter on the fpsyn_in signal, the fpsyn_in signal can go high at any count of the counter 3, depending on the per frame based variation related to the jitter from the low speed reference clock. In this case, the counter 3 could not reloaded to "1" each time the fpsyn_in goes high since otherwise the fpsyn_out signal would not provide a pulse every 8192 mclk cycles, which implies that sometimes one frame pulse would be missing and sometimes one extra frame pulse would be added.

In order to deal with the jitter on the fpsyn_in, the 6-bit accumulator 2 is used in conjunction with the counter 3 to accumulate the variation of the input frame pulse such that corrections can be made to counter 3 for the generation of the fpsyn_out signal as shown in FIG. 6. If the frame-to-frame variation is less than ±4 mclk cycles, which is about ±61 ns, no frame correction will take place immediately, but the variation will be accumulated. If the frame-to-frame variation is from +1 to +4 mclk cycles, the accu will increment by one; if the frame-to-frame variation is from −1 to −4 mclk cycles, the accu will decrement by one. Whenever the total frame accumulation reaches ±16 (110000 or 010000), a frame adjustment will be made. If the frame-to-frame variation is zero mclk cycle, which means the fpsyn_in goes high when the msc is "0" (same as ideal fpsyn_in), the accumulator 2 will keep its old value.

The circuit has several distinct modes of operation. Based on the relationship between fpsyn_in and the content of the master counter msc, there are five modes for the boundary discriminator as follows:

Out of synchronization

Figure 3:
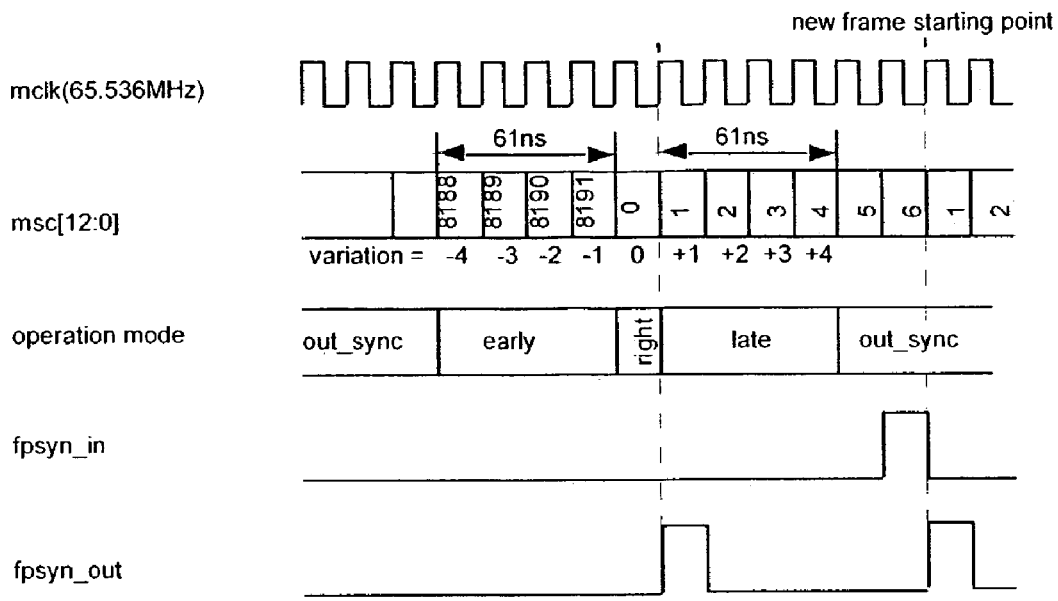
FIG. 3 is an example of an out-of-synchronization mode.

If the signal fpsyn_in goes high when the msc_cnt output is in the range from "5" to "8187", the out_sync signal of the decode block is asserted. The out_sync signal load "1" to the msc counter and clears the accumulator accu. This condition can happen when the msc counter is out of synchronization with the frame starting point. Re-synchronizing the msc is required by reloading the initial value of "1" to msc. This situation is illustrated in FIG. 3.

Frame Late

Figure 4:
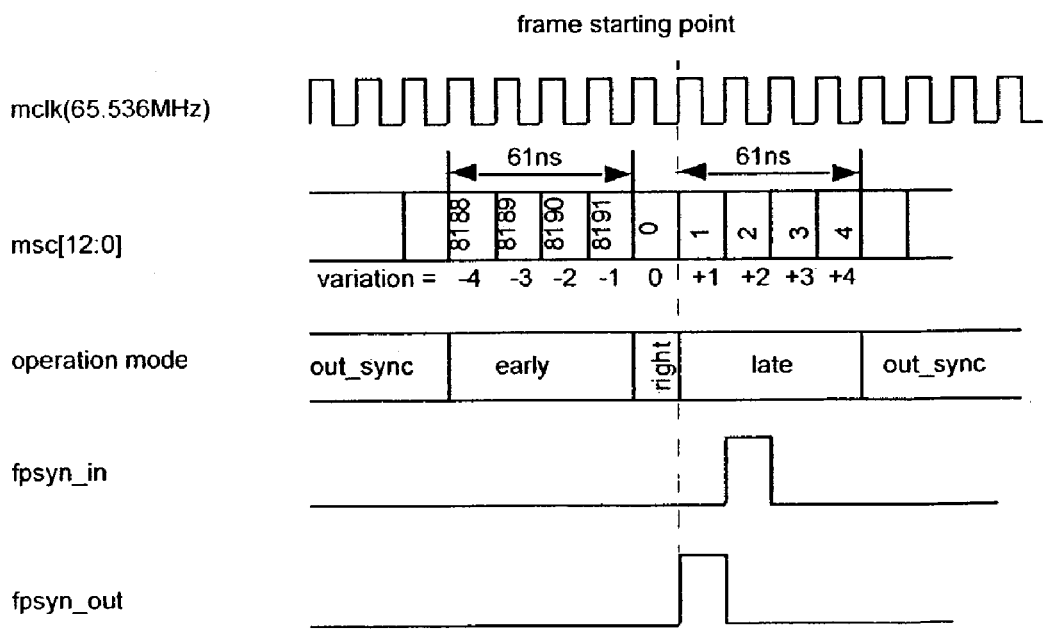
FIG. 4 is an example of frame-late mode.

If the fpsyn_in signal goes high when the msc_cnt output is in the range of "1" to "4", the late signal of the decode block 1 is asserted and the accumulator 2 accu increments by one. This condition happens when input frame pulse is late relative to the current frame information. When the accu reaches the maximum count of "+16" (010000), the pos_full signal 8 of the accumulator 2 accu is asserted. When the counter reaches zero and the pos_full signal is asserted, the counter is re-loaded with 0 and the accumulator 2 is cleared. This has the same effect as repeating a count. After the msc is reloaded, the accu will stop for one frame, and restart after the next fpsyn_in. This situation is illustrated in FIG. 4.

Frame Early

Figure 5:
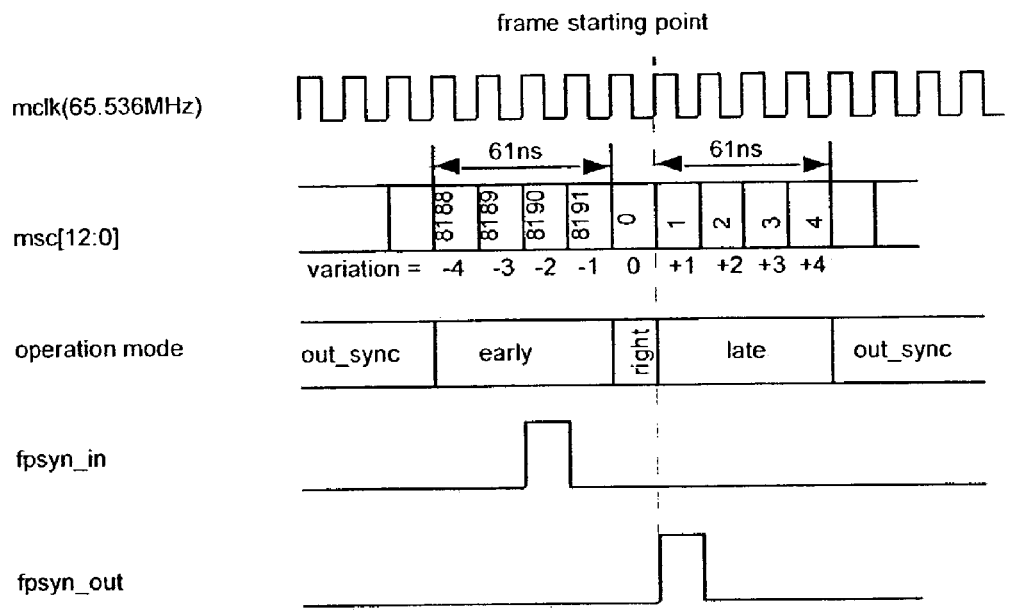
FIG. 5 is an example of frame-early mode.

If the fpsyn_in goes high when the msc_cnt output is the range of "8188" to "8191", the early signal of the decode block is asserted and the accumulator accu is decremented by one. This condition happens when the input frame pulse is early related to the current frame information. When the accu reaches the minimum count of "−16" (110000), the neg_full signal of the accu block is asserted. In this case, when the counter reaches the maximum value of 8191, the counter is loaded with 1 and the accumulator is cleared. This has the effect of skipping a count. After the msc is reloaded, the accu will stop for one frame, and restart after the next fpsyn_in. This situation is illustrated in FIG. 5.

Frame Right

If the signal fpsyn_in goes high when the msc_cnt output is at count of 0, no change occurs in either the counter msc or accumulator accu. This condition happens when no frame variation occurs and is illustrated in FIG. 1.

Frame Fast Tracking

The fbden signal, which is an external control signal, can be used to disable the whole circuit by disabling AND gate 9. When it is low, after passing through the inverter, the ANG gate 9 will be enabled and the frame correction will be made every frame regardless the relationship between the fpsyn_in and the content of the msc counter, which means that the counter msc will be loaded with a 1 and the accumulator cleared every frame by the input frame pulse fpsyn_in. This signal is useful to allow the circuit to perform fast frame tracking during initialization. Once initialization is completed, the fbden signal should be driven high to enable normal operation mode.

Referring again to FIG. 6, it will be seen that the decoder 1 decodes the count value of the master counter msc and generates three output signals, namely a late signal 4, and early signal 5, and an sout-sync signal 6. When the msc count is 8188 to 8191, the early signal 5 goes to high. When the msc count is 1 to 4, the late signal 4 goes to high. If the msc count is 5 to 8187, the out_sync signal 6 goes to high. These three output signals are used by the other two blocks 2, 3 to determine the operation mode of whole circuit.

When the fpsyn_in goes high and the early signal 5 is high, the next mode will be the frame early mode; when the fpsyn_in goes high and the late signal 4 is high, the next mode will be the frame late mode; when the fpsyn_in goes high and out_sync is high, the next mode will be the out of synchronization mode; when the fpsyn_in goes high and none of these three signals is high, the next mode will be the frame right mode.

The accumulator 2 is a 6-bit accumulator. It is triggered by fpsyn_in signal. If the fpsyn_in goes high when the down signal (same as the early signal from decoder block) is high, the accu is decremented by one; if the fpsyn_in goes high when the up signal (same as the late signal from decoder block) is high, the accu will increment by one; if neither down nor up signal is high, the accumulator accu keeps its old value. When the accu reaches −16 (110000) or +16 (010000), a frame adjustment is going to be made, and the accu stops, waiting for the adjust_done signal from the msc to restart again. When the adjust_done occurs, the accumulator 2 is cleared to zero, and keeps being stopped until the second fpsyn_in arrives, which means waiting for one more frame before restart. The accumulator 2 can also be cleared to zero when the clear signal is high, which usually occurs in frame fast tracking mode shown.

Figure 7:
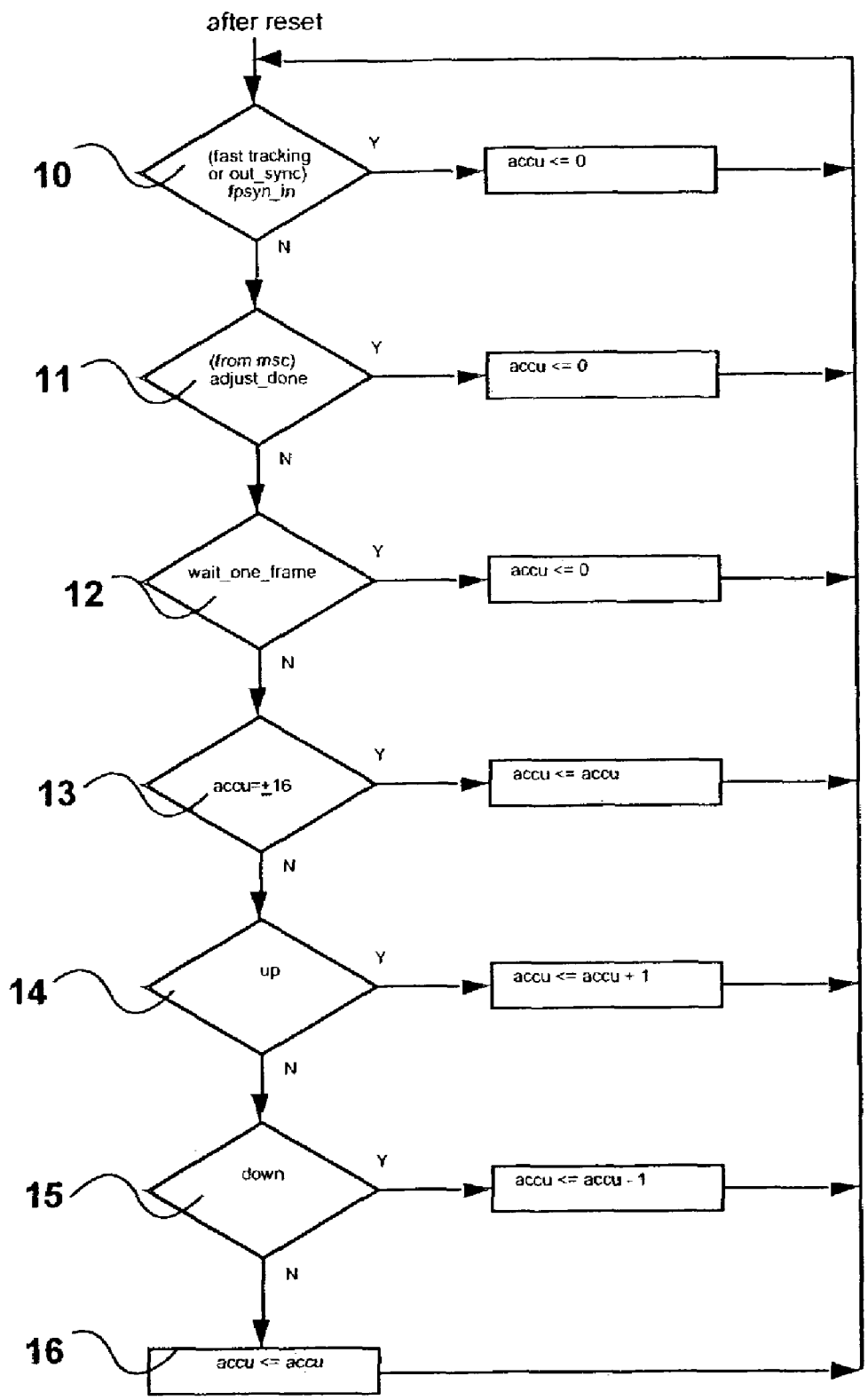
FIG. 7 is a flow chart showing the operation of the frame variation accumulator.

FIG. 7 illustrates the operation flow of the accumulator 2.23. At step 10, if an input frame pulse arrives at a counter value between x and n-y, representing an out-of-sync condition, or a disable signal is active, the accumulator is cleared and the accumulator logic loops to the beginning, else the accumulator logic proceeds to step 11. At step 11, if an adjust_done signal is received from the master counter, indicating an adjustment has taken place, the accumulator 2 is cleared and the accumulator logic loops to the beginning, else the accumulator logic proceeds to step 12. At step 12, if a wait_one_frame signal is received, the accumulator 2 is cleared and the accumulator logic loops to the beginning, else the accumulator logic proceeds to step 13. At step 13, if the accumulator is at an extreme value, the accumulator is cleared and the accumulator logic loops to the beginning, else the accumulator logic proceeds to step 14. At step 14, if an input frame pulse is late, the accumulator increments by one and the accumulator logic loops back to the beginning, else the accumulator logic proceeds to step 15. At step 15, if an input frame pulse is early, the accumulator decrements by one and the accumulator logic loops back to the beginning, else the accumulator logic proceeds to step 16. At step 16, if an input frame pulse is neither late nor early, the accumulator logic loops back to the beginning.

The output signals from the accumulator accu are the neg_full 7 (when accu=−16) and the pos_full 8 (when accu=+16). These two signals 7, 8 are used by the msc block 3 to perform frame adjustment.

The master counter 3 (msc) a 13-bit master counter clocked by the master clock. In the frame fast tracking mode or the out of synchronization mode, when the fpsyn_in goes high, the load signal is high also, and the counter msc is pre-loaded with "1". Other than in these two modes, if the neg_full signal 7 is high (when accu=−16), after the count of 8191, the counter msc will be adjusted (or loaded) to "1", which means removing one count from the counter msc. If the pos_full signal 8 is high (when accu=+16), after the count of 0, the msc will be adjusted to count 0 again, which means adding one more count to the msc. After either case of adjustment, the adjust_done signal from the counter 3 will go high for one cycle, so that the accumulator 2 can restart.

Figure 8:
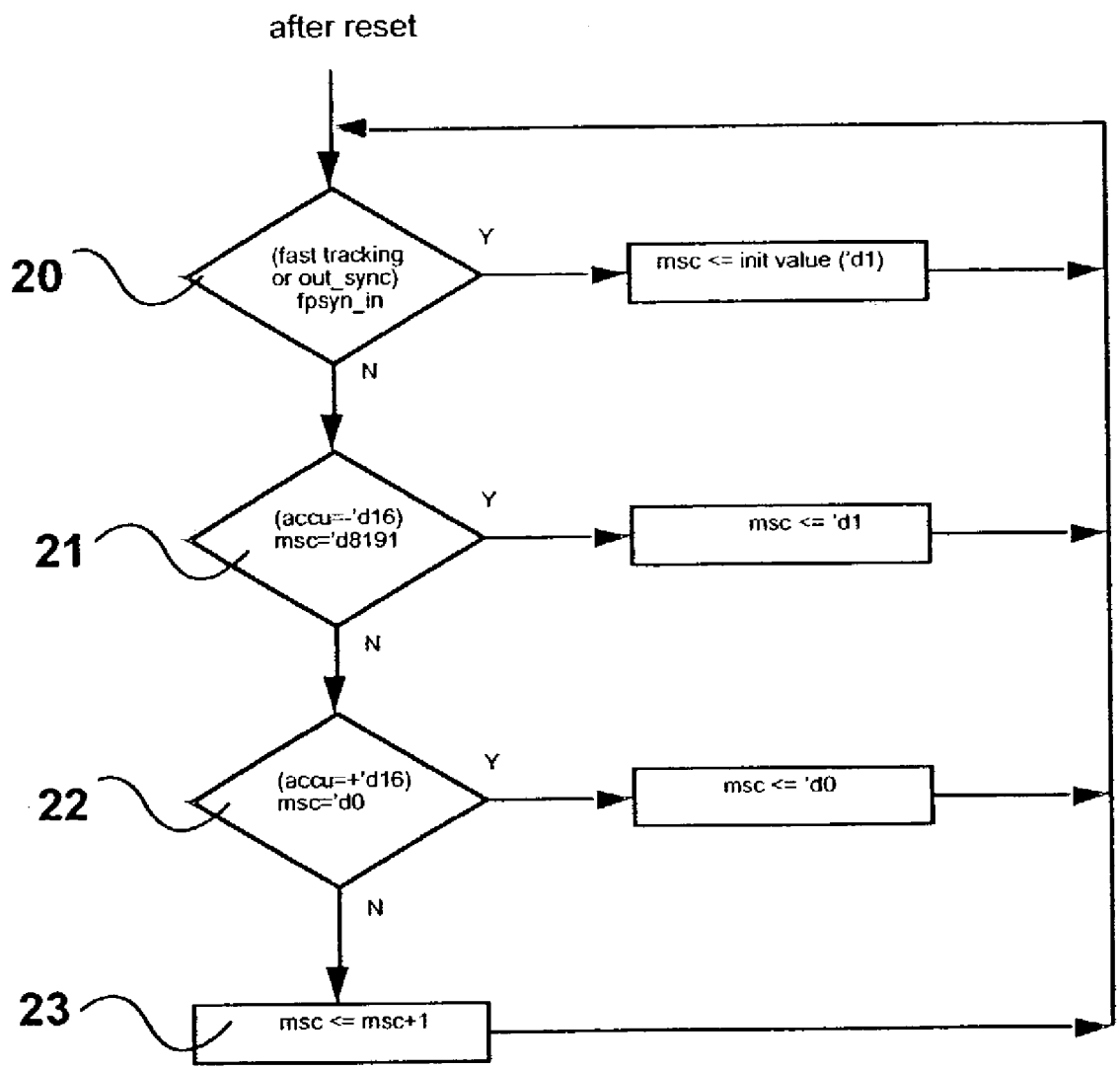
FIG. 8 is a flow chart showing the operation of the master counter.

FIG. 8 illustrates the operation flow of the counter msc block. At step 20, if an input frame pulse arrives at a counter value between x and n-y, representing an out-of-sync condition, or a disable signal is active, the counter value is set to a first initial value and the counter logic loops to the beginning, else the counter logic proceeds to step 21. At step 21, if the accumulator is at a first extreme value, the counter is reset to the first initial value when said counter reaches its maximum value and the counter logic loops to the beginning, else the counter logic proceeds to step 22. At step 22, if the accumulator at a second extreme value, the counter is reset to a second initial value after the counter reaches said second extreme value, that is the second initial value, typically zero is repeated, and the counter logic loops to the beginning, else the counter logic increments said count value by one and loops back to the beginning.

The out-of-sync signal 6 is connected to one input of an OR gate 9a whose output is connected to one input of an AND gate 9. The output of the AND gate 9 is connected to the load input of the master counter 3 and the clear input of the accumulator 2. The other input of AND gate 9 is receives the input frame pulses fpsyn_in. Out-of-sync signal 6 thus enables the load input of master counter 3.

The disable signal fbden is inverted and applied to the second input of OR gate 9a. When the signal fbden is asserted, control circuit consisting of the decoder 1 and accumulator 2 is effectively disabled, so that the master counter 3 continually tracks the input frame pulses.

It will be appreciated by one skilled in the art that many variants of the invention are possible within the scope of the appended claims. In particular, it will be appreciated that the counting scheme for the pulses is arbitrary in the sense that any count value could be regarded as the zero position. For convenience, the counter is considered to start counting at 1 and finish at zero.

The invention claimed is:

1. A frame boundary discriminator comprising:
   a first input for receiving a high speed master clock signal having a multitude of master clock pulses within a frame;
   a second input for receiving synchronized input frame pulses subject to jitter;
   an output frame pulse generator controlled by said high speed master clock signal to generate output frame pulses; and
   a control circuit for comparing the timing of said synchronized input frame pulses with said master clock pulses and adjusting the timing of said output frame pulses to smooth out jitter in said input frame pulses;
   wherein said output frame pulse generator is a master counter clocked by said high speed master clock pulses that generates said output frame pulses on reaching a predetermined count;
   wherein said control circuit adjusts the count of said master counter to adjust the timing of said output frame pulses; and
   wherein there are normally n high speed clock pulses within a frame, where n is a predetermined number, said master counter counts modulo n, said control circuit is configured to assert a first control signal when an input frame pulse arrives at a counter value representing an out-of sync condition, and wherein said counter is configured to adjust its count value to a first predetermined initial value when an input frame pulse arrives while said first control signal is asserted.

2. A frame boundary discriminator as claimed in claim 1, wherein said predetermined initial value is 1.

3. A frame boundary discriminator as claimed in claim 1, wherein said control circuit generates a second control signal when an input frame pulse arrives at a counter value representing a late condition and a third control signal when a frame pulse arrives at a counter value representing a frame early condition, and said control circuit comprises an accumulator that is decremented by one of said second and third control signals and incremented by the other of said second and third control signals, said accumulator upon reaching extreme values asserting respective enable signals that adjust the count value of said master counter when predetermined count values are reached.

4. A frame boundary discriminator as claimed in claim 3, wherein a first of said enable signals resets the count value to zero after zero is reached so as to repeat a count, and a second of said enable signals sets the count value to one after a maximum count value is reached so as to skip a count.

5. A frame boundary discriminator as claimed in claim 3, wherein said control circuit generates said first control signal when said input frame pulse arrives at a counter value between x and n-y, where x and y are numbers that may or may not be equal and are small in relation to n.

6. A frame boundary discriminator as claimed in claim 3, wherein said control circuit generates said second control signal when an input frame pulse arrives at a counter value $d1 \leq x$, where $d_1$ is a first initial value, and said third control signal when a frame pulse arrives at a counter value $\geq n-y$.

7. A frame boundary as claimed in claim 6, wherein said first initial value d1 is 1.

8. A frame boundary discriminator as claimed in claim 6, wherein said second control signal increments said accumulator and said third control signal decrements said accumulator.

9. A frame boundary discriminator as claimed in claim 6, wherein said control circuit includes a decoder that determines the count of said master counter upon arrival of a said input frame pulse.

10. A frame boundary discriminator as claimed in claim 9, wherein said decoder generates no adjustment signal when said input frame pulse arrives on a count value of 0, and no adjustment of said accumulator or said master counter occurs.

11. A frame boundary discriminator as claimed in claim 10, further comprising a disable input for receiving a disable signal to disable said control circuit, and wherein when said control circuit is disabled said counter is reset upon the arrival of each input frame pulse.

12. A frame boundary discriminator as claimed in claimed 11, wherein said second input is connected to a logic element that when active resets said master counter upon arrival of an input frame pulse.

13. A frame boundary discriminator as claimed in claim 12, wherein said logic element is controlled by said first control signal.

14. A frame boundary discriminator as claimed in claim 13, wherein said logic element is also controlled by said disable signal.

15. A frame boundary discriminator as claimed in claim 14, wherein said logic element is an AND gate.

16. A frame boundary discriminator as claimed in claim 15, further comprising an OR gate connected to one input of said AND gate, said OR gate receiving at its inputs said disable signal (or an inversion thereof) and said first control signal.

17. A frame boundary discriminator as claimed in claim 12, wherein said logic element is also connected to an input for clearing said accumulator upon arrival of an input frame pulse.

18. A frame boundary discriminator as claimed in claim 3, wherein said accumulator is a 6-bit accumulator ranging in value from −16 to +16.

19. A method of discriminating frame boundaries in a digital telephony, comprising the steps of:
   generating a high speed master clock signal having a multitude of master clock pulses within a frame;
   receiving synchronized input frame pulses subject to jitter;
   comparing the timing of said synchronized input frame pulses with said master clock pulses;
   generating output frame pulses from said master clock pulses; and
   adjusting the timing of said output frame pulses to smooth out jitter in said input frame pulses;
   counting said high speed clock pulses with a master counter;
   generating said output frame pulses upon said master counter reaching a predetermined count; and
   adjusting a count value of said master counter to adjust the timing of said output frame pulses; and
   wherein there are normally n high speed clock pulses within a frame, where n is a predetermined number, said master counter counts modulo n, and said master counter is reset following the arrival at an input frame pulse at a counter value representing an out-of-sync condition.

20. A method as claimed in claim 19, wherein said counter value representing an out-of-sync condition lies between x and n-y, where x and y are numbers that may or may not be equal and are small in relation to n.

21. A method as claimed in claim 19, wherein a second control signal is generated when an input frame pulse arrives at a counter value $0 \leq x$, a third control signal is generated when a frame pulse arrives at a counter value $\geq n-y$, and one of said second and third control signals decrements an accumulator and the other of said second and third control signals increments an accumulator, and said accumulator upon reaching extreme values asserts enable signals that adjust said master counter when its count reaches predetermined values.

22. A method as claimed in claim 21, wherein said second control signal increments said accumulator and said third control signal decrements said accumulator.

23. A method as claimed in claim 21, wherein no adjustment of said accumulator or said master counter occurs when an input frame pulse arrives on a count of 0.

24. A method as claimed in claim 21, wherein said accumulator performs the following accumulator logic after a reset of said master counter:
   step 1) if an input frame pulse arrives at a counter value between x and n-y, or a disable signal is active, said accumulator is cleared and said accumulator logic loops to the beginning, else said accumulator logic proceeds to step 2;
   step 2) if an adjust_done signal is received from said master counter, said accumulator is cleared and said accumulator logic loops to the beginning, else said accumulator logic proceeds to step 3;

step 3) if a wait_one_frame signal is received, said accumulator is cleared and said accumulator logic loops to the beginning, else said accumulator logic proceeds to step 4;

step 4) if the accumulator is at an extreme value, said accumulator is cleared and said accumulator logic loops to the beginning, else said accumulator logic proceeds to step 5;

step 5) if an input frame pulse is late, the accumulator increments by one and said accumulator logic loops back to the beginning, else said accumulator logic proceeds to step 6;

step 6) if an input frame pulse is early, the accumulator decrements by one and said accumulator logic loops back to the beginning, else said accumulator logic proceeds to step 7; and step 7) if an input frame pulse is neither late nor early, the accumulator logic loops back to the beginning.

25. A method as claimed in claim 24, wherein said master counter performs the following counter logic:

step 1) if an input frame pulse arrives at a counter value between x and n-y, or a disable signal is active, said counter value is set to a first initial value and said counter logic loops to the beginning, else said counter logic proceeds to step 2;

step 2) if the accumulator is at a first extreme value, said counter is reset to said first initial value when said counter reaches its maximum value and said counter logic loops to the beginning, else said counter logic proceeds to step 3;

step 3) if the accumulator is at a second extreme value, said counter is reset to a second initial value after said counter reaches said second extreme value and said counter logic loops to the beginning, else said counter logic increment said count value by one and loops back to the beginning.

* * * * *